United States Patent
Im (10) Patent No.: US 10,424,934 B2
(45) Date of Patent: Sep. 24, 2019

(54) MULTI-INPUT POWER MANAGER

(71) Applicant: Electronics and Telecommunications Research Institute, Daejeon (KR)

(72) Inventor: Jong Pil Im, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 379 days.

(21) Appl. No.: 15/339,567

(22) Filed: Oct. 31, 2016

(65) Prior Publication Data

US 2017/0141578 A1 May 18, 2017

(30) Foreign Application Priority Data

Nov. 13, 2015 (KR) .................. 10-2015-0159875
May 24, 2016 (KR) .................. 10-2016-0063679

(51) Int. Cl.
*H02J 3/38* (2006.01)
*H02J 7/35* (2006.01)

(52) U.S. Cl.
CPC ............ *H02J 3/385* (2013.01); *H02J 7/35* (2013.01)

(58) Field of Classification Search
None
See application file for complete search history.

(56) References Cited

U.S. PATENT DOCUMENTS

| 2012/0175963 A1* | 7/2012 | Adest ............... H02J 1/102 307/82 |
| 2014/0103891 A1* | 4/2014 | Stratakos ............ G05F 1/67 323/271 |
| 2015/0066233 A1 | 3/2015 | Kang et al. |
| 2015/0112495 A1 | 4/2015 | Kim et al. |

OTHER PUBLICATIONS

Michele Dini et al., "A Nanocurrent Power Management IC for Multiple Heterogeneous Energy Harvesting Sources", IEEE Transactions on Power Electronics(2015), 2015, pp. 5665-5680, vol. 30 No. 10, IEEE.

(Continued)

*Primary Examiner* — Thienvu V Tran
*Assistant Examiner* — David M Stables (57) ABSTRACT

A multi-input power manager includes: first to n-th maximum power point tracking circuits for respectively receiving first to n-th powers from the outside and controlling voltages of first to n-th nodes to be first to n-th reference voltages based on the first to n-th powers; first to n-th input capacitors which respectively store the first to n-th powers by control of the first to n-th maximum power point tracking circuits, and are respectively connected to the first to n-th nodes; first to n-th transfer switches which are respectively connected to the first to n-th nodes, and output powers respectively stored in the first to n-th input capacitors, responding to first to n-th transfer switching signals; and a transfer switch control circuit which compare the first to n-th reference voltages and the voltages of the first to n-th nodes respectively, and generate the first to n-th transfer switching signals accordingly.

15 Claims, 9 Drawing Sheets

(56) References Cited

OTHER PUBLICATIONS

Salvador Carreon-Bautista et al., "Boost Converter With Dynamic Input Impedance Matching for Energy Harvesting With Multi-Array Thermoelectric Generators", IEEE on Industrial Electronics(2014), 2014, pp. 5345-5353, vol. 61, No. 10, IEEE Transactions.

Chia-Lun Chang et al., "A Compact Multi-Input Thermoelectric Energy Harvesting System with 58.5% Power Conversion Efficiency and 32.4-mW Output Power Capability", 2014 International Symposium on Integrated Circuits (ISIC), 2014, pp. 1-4, IEEE.

Energy Harvesting (EH) Multi-Source Demo Board, Demo Manual DC2080A with Transducers, Linear Technology Corporation 2013, pp. 1-18, USA.

\* cited by examiner

MULTI-INPUT POWER MANAGER

CROSS-REFERENCE TO RELATED APPLICATIONS

This U.S. non-provisional patent application claims priority under 35 U.S.C. § 119 of Korean Patent Application Nos. 10-2015-0159875, filed on Nov. 13, 2015, and 10-2016-0063679, filed on May 24, 2016, the entire contents of which are hereby incorporated by reference.

BACKGROUND

The present disclosure herein relates to a power harvesting system, and more particularly, to a multi-input power manager.

As electronic devices get smaller these days, the life or capacity of batteries included in the electronic devices becomes an issue. An energy harvesting power conversion system is being developed recently in order to address the issue. The energy harvesting power conversion system is used in various small-device or low-power application environments such as a wireless sensor network, for the purpose of implementing battery-less system or battery-powered system with an increased battery life. In the energy harvesting power conversion system, the maximum output power is one of the biggest issues. Accordingly, a maximum power point tracking (MPPT) technology is used to continuously transfer the energy needed in a load, store maximum energy in an energy storage device, or to maximize an energy capacity which can be supplied.

Particularly, a multi-input source structure receives energy from a plurality of energy sources, and high power may thus be output when the energy from each of the plurality of energy sources is added up. In order to simultaneously output the energy received from the energy sources, however, separate power conversion devices are required for each energy source. Since the separate power conversion devices require large areas, it is difficult to apply the multi-input source structure to a small device.

SUMMARY

The present disclosure provides a multi-input power manager by which multiple input powers are efficiently used.

An embodiment of the inventive concept provides a multi-input power manager which includes: first to n-th maximum power point tracking (MPPT) circuits configured to respectively receive first to n-th powers (where, n is a natural number greater than one) from the outside, and to respectively control voltages of first to n-th nodes to be first to n-th reference voltages on the basis of the first to n-th powers, first to n-th input capacitors configured to respectively store the first to n-th powers according to control of the first to n-th MPPT circuits, and respectively connected to the first to n-th nodes, first to n-th transfer switches respectively connected to the first to n-th nodes, and configured to output, as output powers, powers, which are respectively stored in the first to n-th input capacitors, in response to first to n-th transfer switching signals, and a transfer switch control circuit configured to compare the first to n-th reference voltages and the voltages of the first to n-th nodes, respectively, and to generate the first to n-th transfer switching signals according to comparison results, wherein, when the voltage of the first node reaches the first reference voltage, the transfer switch control circuit activates the first transfer switching signal to turn on the first transfer switch connected to the first node.

In example embodiments, when the first transfer switching signal is activated, the transfer switch control circuit deactivates the second to n-th transfer switching signals to turn off the second to n-th transfer switches.

In example embodiments, when the voltage of the first node connected to the first transfer switch which is turned on reaches a first minimum voltage, the transfer switch control circuit deactivates the first transfer switching signal to turn off the first transfer switch.

In example embodiments, after the first transfer switch is turned off, the transfer switch control circuit generates the first to n-th transfer switching signals to turn on a transfer switch connected to the node having a voltage reaching the corresponding reference voltage, among the second to n-th nodes, whose.

In example embodiments, the first MPPT circuit comprises a first voltage ratio controller configured to receive the first power, and determine the first reference voltage based on the received first power, a first internal capacitor configured to be charged to the first power according to control of the first voltage ratio controller, a first switch connected between the first internal capacitor and the first node, a first comparator configured to compare the first reference voltage and a voltage of the first internal capacitor, and a first control circuit configured to control the first switch based on a comparison result of the first comparator.

In example embodiments, the first to n-th reference voltages are different from each other.

In example embodiments, at least two of the first to n-th powers are supplied from a same power source, and at least two of the first to n-th reference voltages are equal to each other.

In example embodiments, the transfer switch control circuit deactivates the first transfer switching signal after a predetermined time elapses from when the first transfer switching signal is activated.

In example embodiments, the transfer switch control circuit deactivates the first transfer switching signal when the voltage of at least one node of the second to n-th nodes reaches the corresponding reference voltage.

In example embodiments, after deactivating the first transfer switching signal, the transfer switch control circuit generates the first to n-th transfer switching signals to turn on the transfer switch connected to the at least one node.

In example embodiments, the first to n-th reference voltages respectively indicate voltages at which the first to n-th powers become maximum powers.

An embodiment of the inventive concept provides a multi-input power manager which includes: a first maximum power point tracking (MPPT) circuit configured to receive a first power and track a maximum power point of the first power, a first capacitor configured to store the first power under control of the first MPPT circuit, a first transfer switch configured to operate in response to a first transfer switching signal and connected between the first capacitor and an output node, a second MPPT circuit configured to receive a second power and track a maximum power point of the second power, a second capacitor configured to store the second power under control of the second MPPT circuit, a second transfer switch configured to operate in response to a second transfer switching signal and connected between the second capacitor and the output node, and a transfer switch control circuit configured to generate the first and second transfer switching signals based on a comparison of a first reference voltage from the first MPPT circuit and a voltage of the first capacitor and a comparison of a second reference voltage from the second MPPT circuit and a voltage of the second capacitor. When the voltage of any one of the first and second capacitors reaches the corresponding reference voltage, the transfer switch control circuit generates the first and second transfer switching signals to turn on a transfer switch connected to the any one capacitor.

In example embodiments, the first and second reference voltages are different from each other.

In example embodiments, the first MPPT circuit comprises a first voltage ratio controller configured to receive the first power and determine the first reference voltage at which the received first power becomes a maximum power, a first internal capacitor configured to be charged to a power from the first voltage ratio controller, a first switch connected between the first internal capacitor and the first capacitor, a first comparator configured to compare the first reference voltage and a voltage of the first internal capacitor, and a first control circuit configured to control the first switch based on a comparison result of the first comparator.

In example embodiments, the second MPPT tracking circuit comprises a second voltage ratio controller configured to receive the second power and determine the second reference voltage at which the received second power becomes a maximum power, a second internal capacitor configured to be charged to a power from the second voltage ratio controller, a second switch connected between the second internal capacitor and the second capacitor, a second comparator configured to compare the second reference voltage and a voltage of the second internal capacitor, and a second control circuit configured to control the second switch based on a comparison result of the second comparator.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to describe principles of the inventive concept. In the drawings.

DETAILED DESCRIPTION

Hereinafter, embodiments of the inventive concept are described in more detail with reference to the accompanying drawings. In the following description, specific details such as detailed configurations or structures are described to provide more general understandings of the embodiments of the inventive concept. Therefore, various changes and modifications to the embodiments of the inventive concept can be made by those skilled in the art within the spirit and scope of the present invention. Additionally, descriptions of well-known functions and structures are omitted for clarity and brevity. The terms used in the following description are defined in consideration of the functions of the present invention, and are not limited to specific functions. Definition of the terms is determined on the basis of the detailed description.

The modules in the following drawings or detailed description can be connected to entities other than what are hereinafter illustrated or described. The connections between the modules or between components can be direct or indirect. The connections between the modules or between the components can be connections by communication or physical connections.

Figure 1:
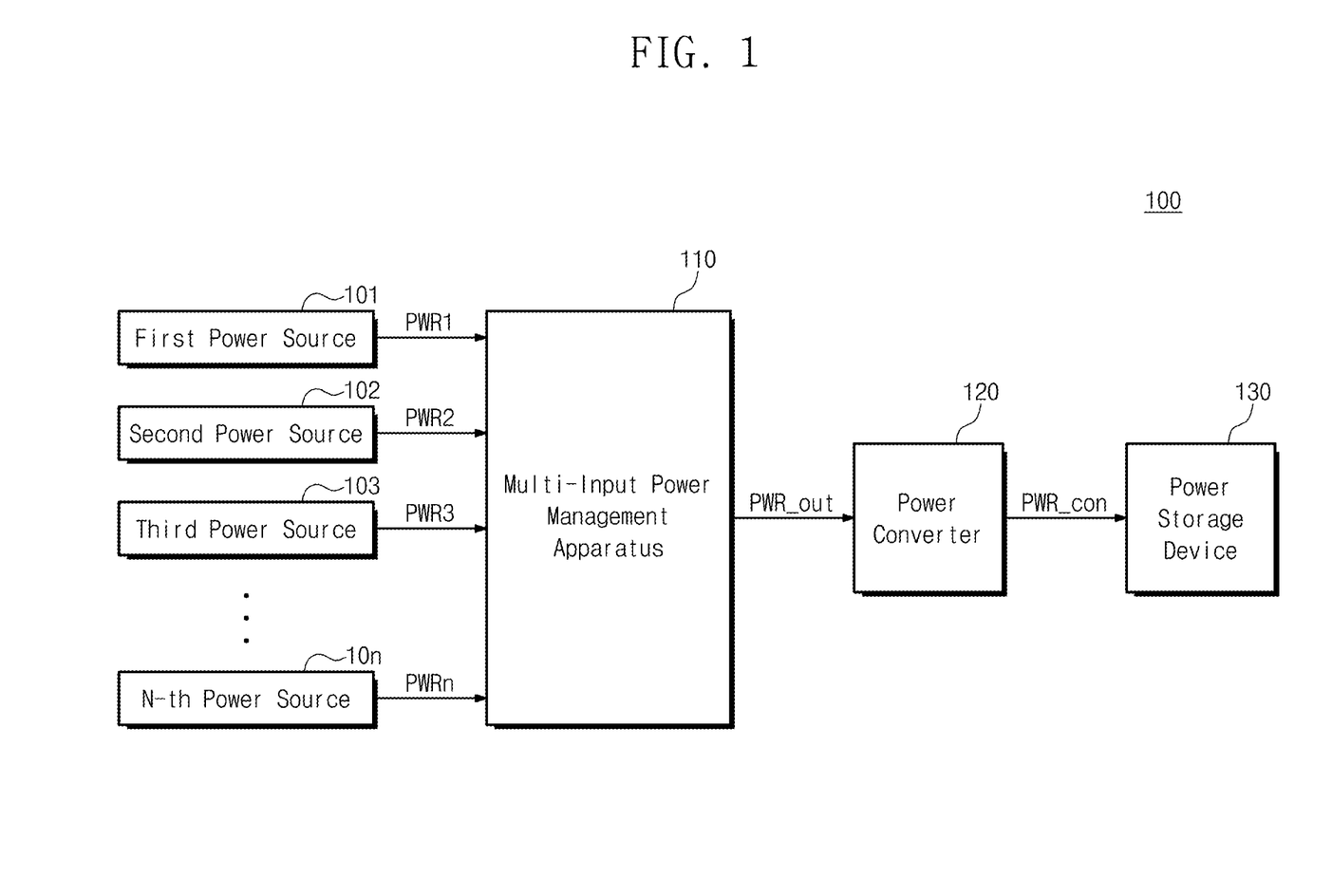
FIG. 1 is a block diagram illustrating a multi-input power management system according to an embodiment of the inventive concept.

FIG. 1 is a block diagram illustrating a multi-input power management system according to an embodiment of the inventive concept. Referring to FIG. 1, a multi-input power management system 100 may include a plurality of power sources 101 to 10$n$, a multi-input power manager 110, a power converter 120, and a power storage device 130.

The plurality of power sources 101 to 10$n$ may respectively output first to n-th powers PWR1 to PWRn. For example, the plurality of power sources 101 to 10$n$ may convert physical energy such as sunlight, vibration, torque, heat, etc., into electric energy to respectively output the first to n-th powers PWR1 to PWRn. That is, the plurality of power sources 101 to 10$n$ may be the same energy source or different energy sources. In example embodiments, the plurality of power sources 101 to 10$n$ may be power generators such as a photovoltaic cell, a piezoelectric device, a solar heat cell, and a small generator, respectively.

The multi-input power manager 110 may receive the first to n-th powers PWR1 to PWRn from the first to n-th power sources 101 to 10$n$ and manage the received first to n-th powers PWR1 to PWRn to supply an output power PWR_out to the power converter 120. For example, the multi-input power manager 110 may respectively store the first to n-th powers PWR1 to PWRn in different energy storage devices (for example, capacitors), and output the first to n-th powers PWR1 to PWRn as the output power PWR_out in a time-interleaved manner.

For a more detailed example, the multi-input power manager 110 may respectively store the first to n-th powers PWR1 to PWRn in different energy storage devices (for example, capacitors), and output the first to n-th powers PWR1 to PWRn as the output power PWR_out in order in which a voltage of each of the energy storage devices reaches a reference voltage. That is, the multi-input power manager 110 may supply the output power PWR_out without dissipating the powers PWR1 to PWRn from the plurality of power sources 101 to 10$n$.

The power converter 120 may receive the output power PWR_out from the multi-input power manager 110, and convert the received output power PWR_out so as to output converted power PWR_con. The power converter 120 may include at least one of various power converting devices such as a DC-to-DC converter, an AC-to-DC converter, and a DC-to-AC converter.

The power storage device 130 may receive the converted power PWR_con, and store the converted power PWR_con.

The power storage device 130 may include a power storage medium such as a battery and a capacitor.

As described above, by outputting a plurality of input powers in the time-interleaved manner, the multi-input power manager 110 according to the embodiments of the inventive concept may use the powers from the plurality of power sources without dissipation.

Figure 2:
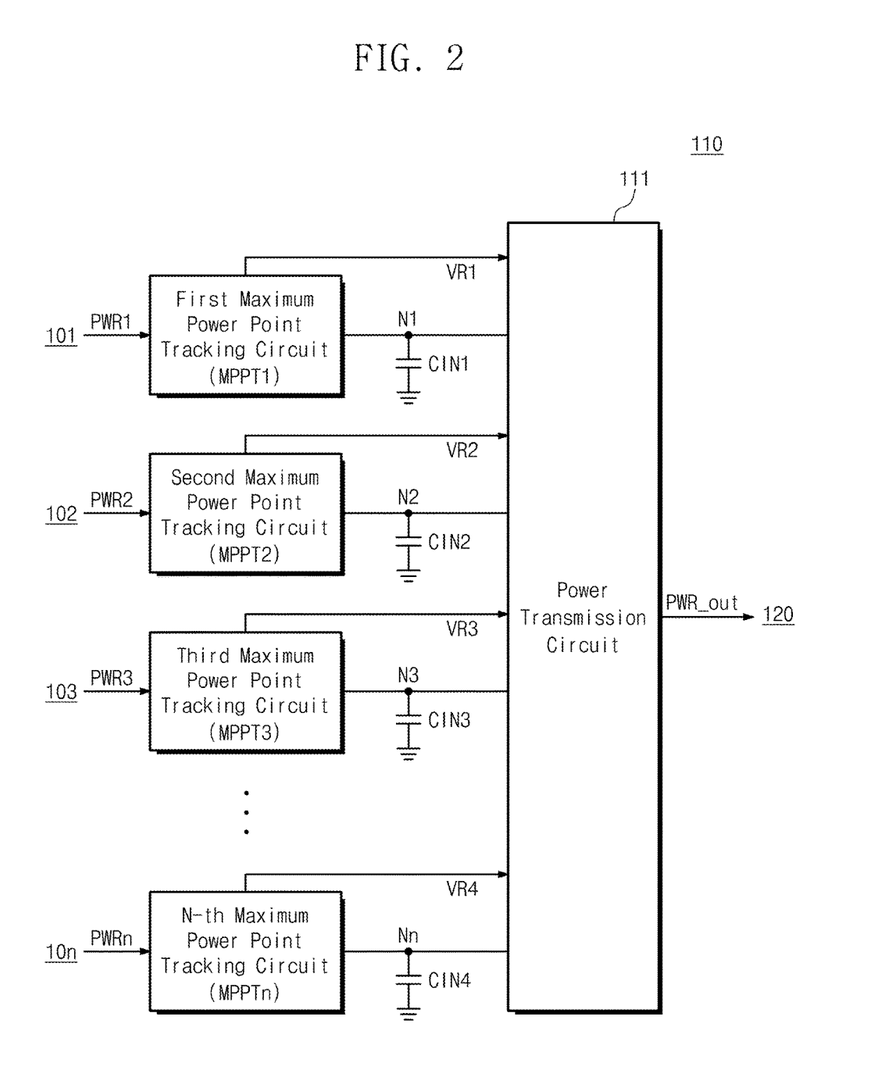
FIG. 2 illustrates in detail the multi-input power manager illustrated in FIG. 1.

FIG. 2 illustrates in detail the multi-input power manager illustrated in FIG. 1. Referring to FIGS. 1 and 2, the multi-input power manager 110 includes first to n-th maximum power point tracking circuits MPPT1 to MPPTn, first to n-th input capacitors CIN1 to CINn, and a power transfer circuit 111.

The first to n-th maximum power point tracking circuits MPPT1 to MPPTn may respectively receive the first to n-th powers PWR1 to PWRn from the first to n-th power sources 101 to 10n, and control voltages of the first to n-th nodes N1 to Nn such that each of the received powers become a maximum. In example embodiments, the first to n-th maximum power point tracking circuits MPPT1 to MPPTn may respectively store the first to n-th powers PWR1 to PWRn in the first to n-th input capacitors CIN1 to CINn such that the voltages of the first to n-th nodes N1 to Nn become respectively the first to n-th reference voltages VR1 to VRn. In example embodiments, the first to n-th reference voltages VR1 to VRn may respectively indicate voltage levels at which the first to n-th powers PWR1 to PWRn may be supplied as maximum powers.

The power transfer circuit 111 may receive the first to n-th reference voltages VR1 to VRn from the first to n-th maximum power point tracking circuits MPPT1 to MPPTn. The power transfer circuit 111 may output, as the output power PWR_out, a power stored in any one of the first to n-th input capacitors CIN1 to CINn, on the basis of the received first to n-th reference voltages VR1 to VRn and the voltages of the first to n-th nodes N1 to Nn. In example embodiments, the power transfer circuit 111 may consecutively output the powers stored in the first to n-th input capacitors CIN1 to CINn in the manner of the time-interleaving technique.

Figure 3:
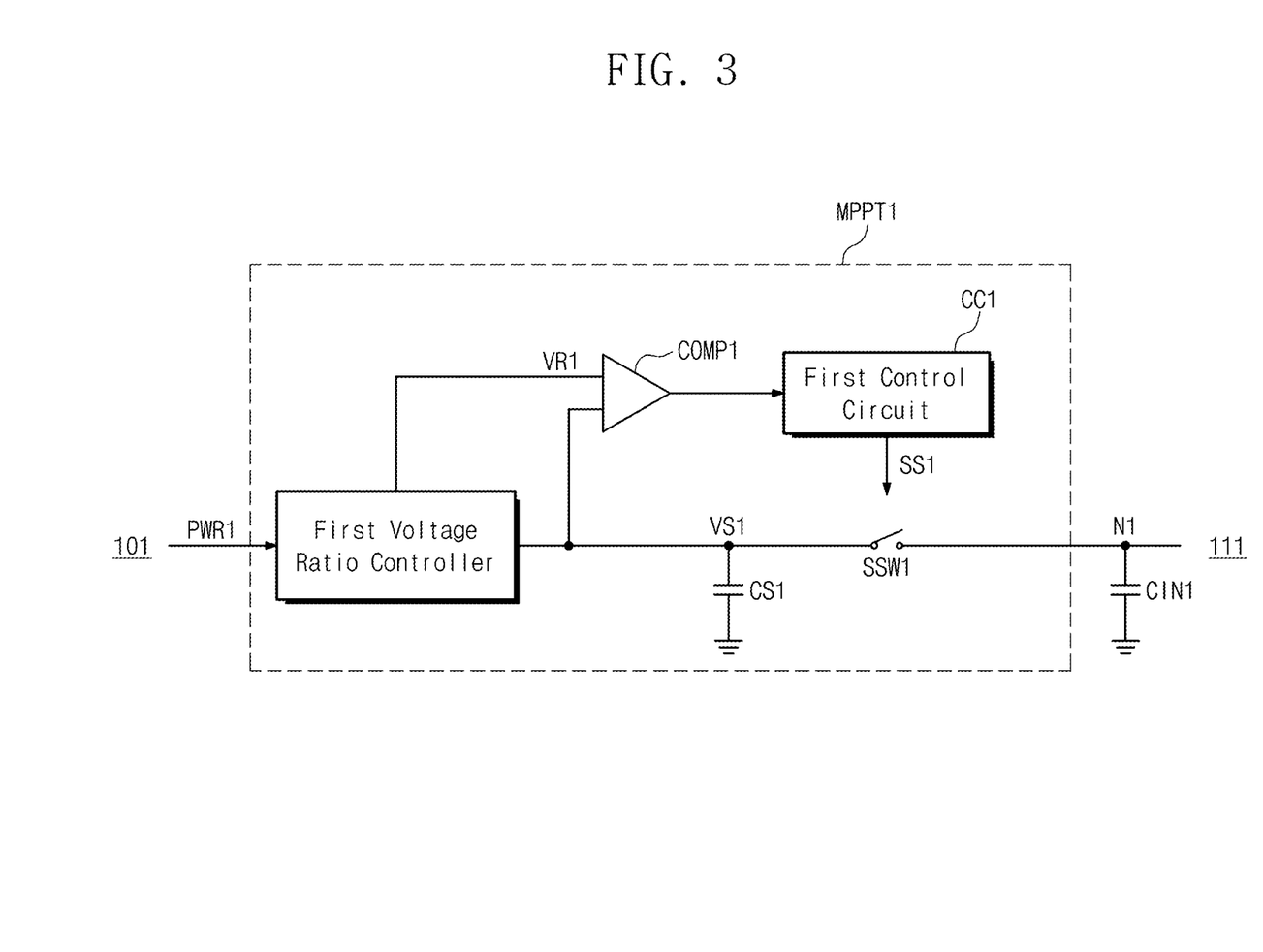
FIG. 3 illustrates a first maximum power point tracking circuit illustrated in FIG. 2.

FIG. 3 illustrates the first maximum power point tracking circuit MPPT1 in FIG. 2. In example embodiments, the first maximum power point tracking circuit MPPT1 is described with reference to FIG. 3, however, the scope of the inventive concept is not limited thereto. The second to n-th maximum power point tracking circuits MPPT2 to MPPTn may also have similar structures to that of the first maximum power point tracking circuit MPPT1 in FIG. 3.

Referring to FIGS. 2 and 3, the first maximum power point tracking circuit MPPT1 includes a first voltage ratio controller VRC1, a first comparator COMP1, a first control circuit CC1, and a first internal capacitor CS1.

The first voltage ratio controller VRC1 may generate the first reference voltage VR1 corresponding to the first power source 101. For example, factors such as types of the first power source 101 or the impedance between the first power source 101 and the first voltage ratio controller VRC1 may cause a voltage level, at which the first power PWR1 may be supplied to the maximum, to vary. The first voltage ratio controller VRC1 may determine the first reference voltage VR1 at which the first power PWR1 may be supplied to the maximum.

The first comparator COMP1 may receive the first reference voltage VR1 from the first voltage ratio controller VRC1, and compare the first reference voltage VR1 received and a voltage VS1 of the first internal capacitor CS1. The first comparator COMP1 may provide the first control circuit CC1 with a comparison result.

The first control circuit CC1 may control a first switch SSW1 in response to the comparison result from the first comparator COMP1. For example, when the voltage of the first internal capacitor CS1 is higher than the first reference voltage VR1, the first control circuit CC1 may turn off the first switch SSW1, and when the voltage of the first internal capacitor CS1 is lower than the first reference voltage VR1, the first control circuit CC1 may turn on the first switch SSW1. By a switching control operation of the first control circuit CC1, the voltage of the first node N1 (that is, a charged voltage of the first input capacitor CIN1) may rise up to the first reference voltage VR1.

As described above, the first maximum power point tracking circuit MPPT1 may control the charged voltage of the first input capacitor CIN1 such that the input first power PWR1 may be supplied to the maximum. In example embodiments, the first maximum power point tracking circuit MPPT1 described with reference to FIG. 3 is an illustrative example, and the first maximum power point tracking circuit MPPT1 may be realized based on various well-known algorithms.

Figure 4:
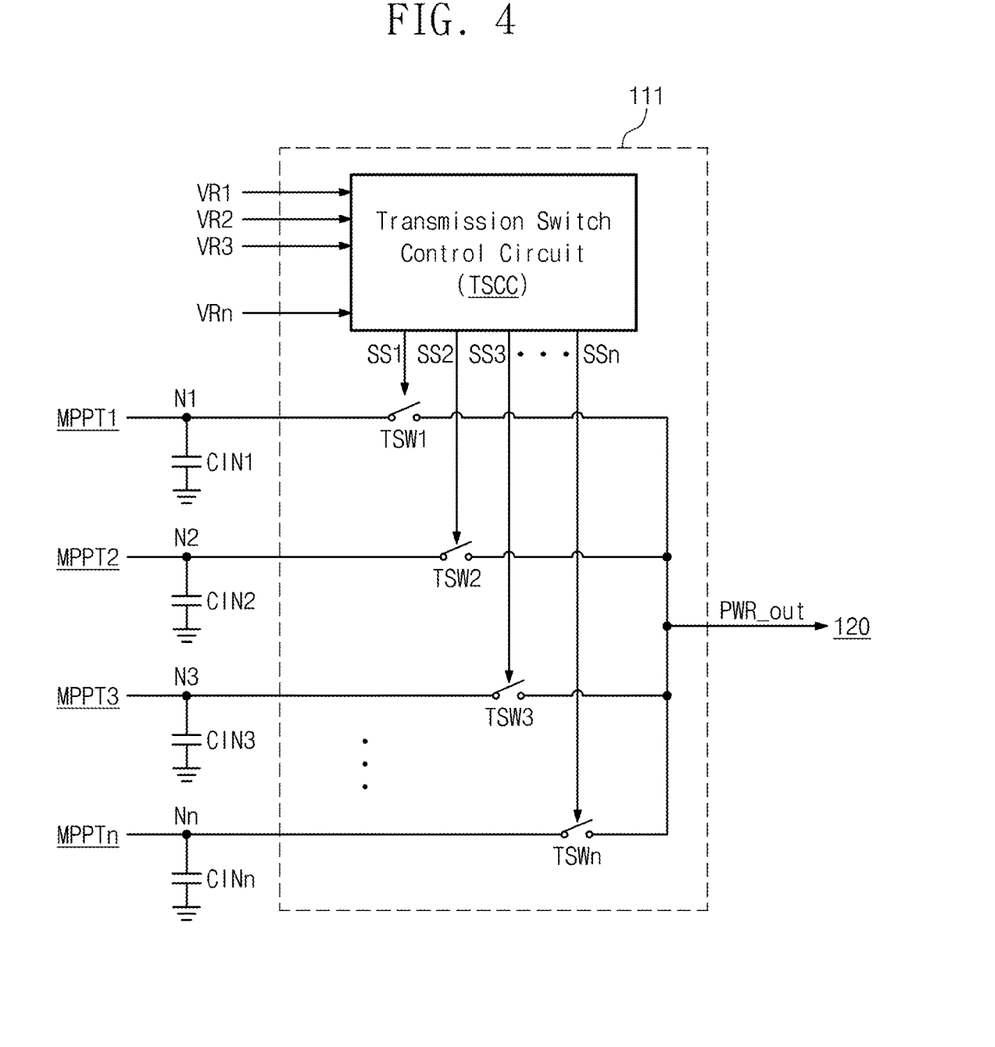
FIG. 4 illustrates in detail a power transfer circuit in FIG. 2.

FIG. 4 illustrates in detail the power transfer circuit in FIG. 2. Referring to FIGS. 2 and 4, the power transfer circuit 111 includes a transfer switch control circuit TSCC, and first to n-th transfer switches TSW1 to TSWn.

The first to n-th transfer switches TSW1 to TSWn are respectively connected to the first to n-th nodes N1 to Nn. Each of the first to n-th transfer switches TSW1 to TSWn may operate according to control of the transfer switch control circuit TSCC.

The transfer switch control circuit TSCC may receive the first to n-th reference voltages VR1 to VRn from the first to n-th maximum power point tracking circuits MPPT1 to MPPTn, compare the received first to n-th reference voltages VR1 to VRn and the voltages of the first to n-th nodes N1 to Nn, respectively, and may output first to n-th transfer switching signals TSS1 to TSSn for controlling the first to n-th transfer switches TSW1 to TSWn on the basis of comparison results.

For example, the voltage of the first node N1 may first reach the first reference voltage VR1. In this case, the transfer switch control circuit TSCC may turn on the first transfer switch TSW1 such that the power stored in the first input capacitor CIN1 is output as the output power PWR_out.

In example embodiments, while the first transfer switch TSW1 is turned on, other transfer switches (for example, the second to n-th transfer switches TSW2 to TSWn) may maintain a turned-off state.

In example embodiments, when the power of the first node N1 decreases to a certain level (for example, to a predetermined minimum level), the transfer switch control circuit TSCC may turn off the first transfer switch TSW1. After that, the transfer switch control circuit TSCC may turn on a transfer switch in correspondence to a node which reaches a corresponding reference voltage.

More specifically, the first to n-th maximum power point tracking circuits MPPT1 to MPPTn respectively may control the voltages of the first to n-th nodes N1 to Nn such that the first to n-th powers PWR1 to PWRn are maximized. At this moment, according to types or characteristics of the power sources, and capacitances of the first to n-th input capacitors CIN1 to CINn, timings at which the voltages of the first to n-th nodes N1 to Nn respectively reach the corresponding reference voltages may be different from each other.

The transfer switch control circuit TSCC may control the first to n-th transfer switching signals TSS1 to TSSn such that the power of the input capacitor connected to a node, the voltage of which first reaches the reference voltage, is output to the power converter 120, on the basis of the comparison results obtained by respectively comparing the voltages of the first to n-th nodes N1 to Nn and the first to n-th reference voltages VR1 to VRn.

In this case, when one switch is turned on, remaining switches maintain turned-off states. For example, the voltage of the first node N1 may first reach a target voltage (that is, the first reference voltage VR1). In this case, the transfer switch control circuit TSCC may output the first transfer switching signal SS1 of a 'logic high' level. In response to the first transfer switching signal SS1 of a logic high level, the first transfer switch TSW1 is turned on, and the power stored in the first input capacitor CIN1 may be supplied to the power converter 120 through the first transfer switch TSW1. At this moment, while the first transfer switch TSW1 is turned on, the voltage of the second node N2 may reach the second reference voltage VR2. In this case, since the first transfer switch TSW1 is turned on, the second transfer switch TSW2 maintains a turned-off state. Thereafter, the first transfer switch TSW1 may be turned off, and then the second transfer switch TSW2 may be turned on.

In example embodiments, when the voltage of the first node N1 becomes lower than or equal to the minimum voltage, or when a predetermined time passes from the moment the first transfer switch TSW1 is turned on, or when any one of other nodes reaches the corresponding reference voltage, the first transfer switch TSW1 may be turned off.

In example embodiments, while any one switch is turned on, an amount of power supplied through the any one switch may be larger than an amount of power charged to a corresponding capacitor. In other words, a speed at which output power PWR_out is supplied to the power converter 120 may be faster than a speed at which the power is charged to the corresponding capacitor.

As described above, the multi-input power manager 110 according to the embodiments of the inventive concept may receive and store the plurality of powers through separate maximum power point tracking circuits, and supply the powers to the power converter 120 on the basis of order in which the voltage level of the stored power reaches the corresponding reference voltage. Accordingly, in the multi-input power system, the plurality of powers may all be used by using a single power converter without dissipation of the plurality of powers. Therefore, a power system with improved efficiency is provided.

Figure 5:
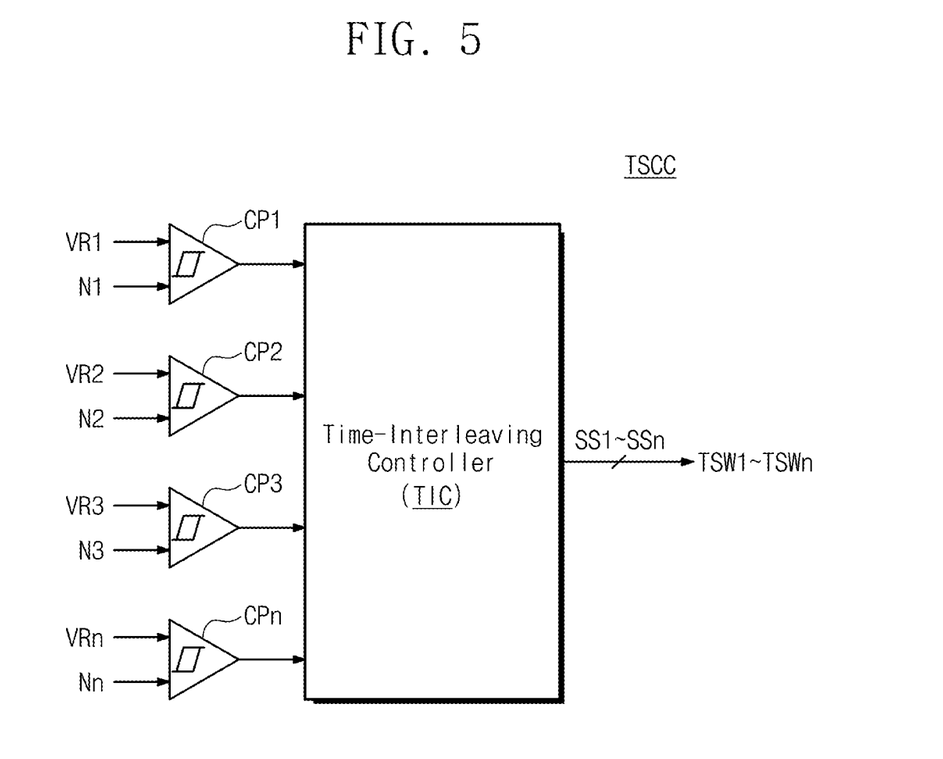
FIG. 5 illustrates a transfer switch control circuit in FIG. 4.

FIG. 5 illustrates a transfer switch control circuit in FIG. 4. The transfer switch control circuit TSCC includes first to n-th comparators CP1 to CPn and a time-interleaving controller TIC. The first to n-th comparators CP1 to CPn respectively receive the first to n-th reference voltages VR1 to VRn and the voltages of the first to n-th nodes N1 to Nn, compare the received voltages, and may output comparison results.

The time-interleaving controller TIC may receive the comparison results from each of the first to n-th comparators CP1 to CPn, and may output the first to n-th transfer switching signals TSS1 to TSSn based on the comparison results. In example embodiments, the time-interleaving controller TIC may output the first to n-th transfer switching signals TSS1 to TSSn in the manners as described above.

In example embodiments, the first to n-th comparators CP1 to CPn may have hysteresis characteristics. For example, when the voltage of the first node N1 is higher than the first reference voltage VR1, the first comparator CP1 may output a signal of a logic high level. After outputting the signal of a logic high level, the first comparator CP1 may output a signal of a logic low level when the voltage of the first node N1 becomes a first minimum voltage lower than the first reference voltage VR1. Accordingly, the first comparator CP1 may have the hysteresis characteristic. The second to n-th comparators CP2 to CPn may also have similar characteristics to that of the first comparator CP1.

As described above, the multi-input power manager 110 according to the embodiments of the inventive concept may receive and store the plurality of powers through separate maximum power point tracking circuits, and supply the powers to the power converter 120 on the basis of order in which the voltage level of the stored power reaches the corresponding reference voltage. Accordingly, in the multi-input power system, the plurality of powers may all be used by using a single power converter without dissipation of the plurality of powers. Therefore, a power system with improved efficiency is provided.

Figure 6:
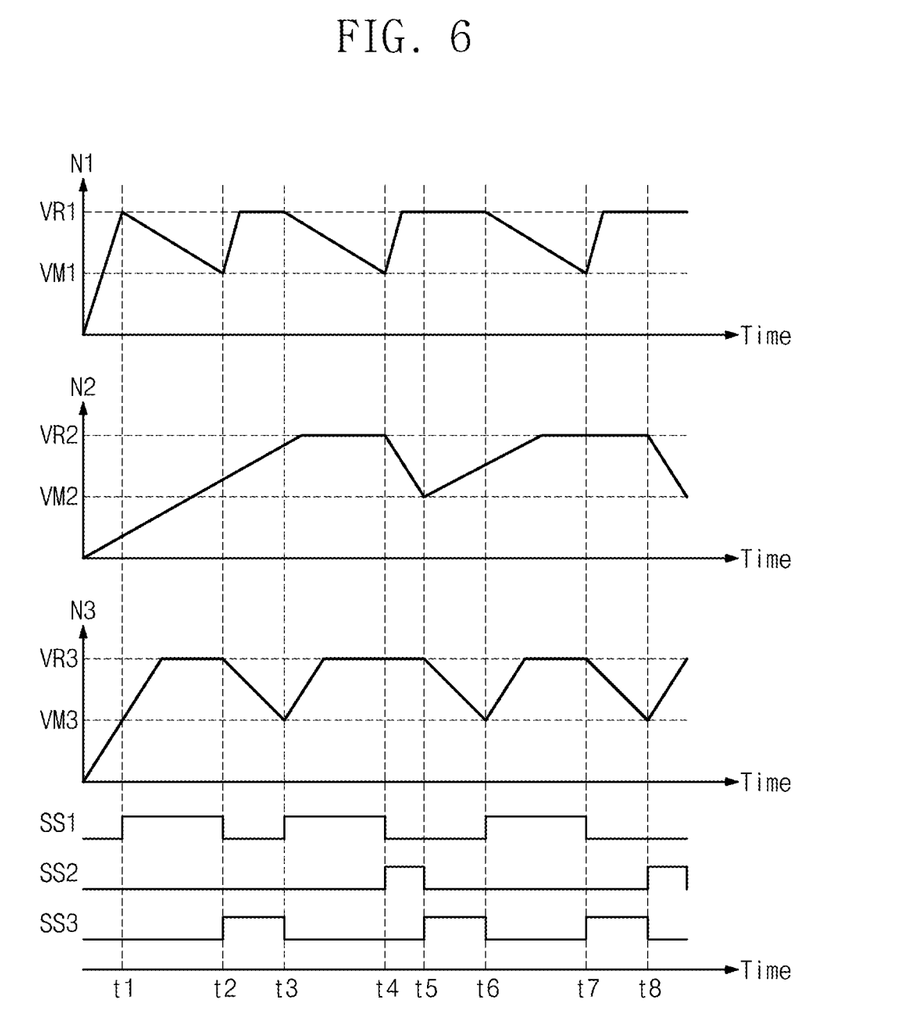
FIG. 6 is a graph showing an operation of the multi-input power manager in FIG. 2.

FIG. 6 is a graph showing an example embodiment of an operation of the multi-input power manager in FIG. 2. In example embodiments, each graph is schematized for brevity of drawing. In other words, graphs shown in FIG. 6 are schematic, and actual waveforms of voltages or signals may be different from those shown in FIG. 6.

In the graphs shown in FIG. 6, X-axes represent time, and Y-axes respectively represent the voltage of the first node N1, the voltage of the second node N2, the voltage of the third node N3, and levels of the first to third transfer switching signals TSS1, TSS2, and TSS3.

Referring to FIGS. 2 to 6, the first to third maximum power point tracking circuits MPPT1 to MPPT3 may respectively control the voltages of the first to third nodes N1 to N3 such that the first to third powers PWR1 to PWR3 are maximized. For example, as illustrated in FIG. 3, the first maximum power point tracking circuit MPPT1 may receive the first power PWR1, and charge the first input capacitor CIN1 such that the voltage of the first node N1 becomes the first reference voltage VR1. Similarly, the second and third maximum power point tracking circuits MPPT2 and MPPT3 may receive the second and third powers PWR2 and PWR3, respectively, and charge the second and third input capacitors CIN2 and CIN3 such that the voltages of the second and third nodes N2 and N3 become the second and third reference voltages VR2 and VR3. In example embodiments, as previously described, the first to third reference voltages VR1 to VR3 may have different levels according to types or characteristics of the power sources.

At a first timing t1, the voltage of the first node N1 may reach the first reference voltage VR1. In this case, as previously described, the transfer switch control circuit TSCC may activate the first transfer switching signal TSS1 such that power may be supplied from the first input capacitor CIN1 to the power converter 120 through the first transfer switch TSW1. The first transfer switch TSW1 is turned on in response to the activated first transfer switching signal TSS1, and the power may be supplied from the first input capacitor CIN1 to the power converter 120 through the first transfer switch TSW1 which is turned on.

In example embodiments, while the first transfer switch TSW1 is turned on, an amount of power supplied to the power converter 120 through the first transfer switch TSW1 may be larger than an amount of power charged to the first input capacitor CIN1 by the first maximum power point tracking circuit MPPT1. Accordingly, as shown in FIG. 6, while the first transfer switch TSW1 is turned on, the voltage of the first node N1 may become lower.

At a second timing t2, the voltage of the first node N1 may be lowered to a first minimum voltage VM1. In this case, the transfer switch control circuit TSCC deactivates the first transfer switching signal TSS1, and the first transfer switch TSW1 is turned off in response to the deactivated first transfer switching signal SS1. In example embodiments, the first minimum voltage VM1 may be a voltage that is predetermined by the first maximum power point tracking circuit MPPT1.

In example embodiments, the transfer switch control circuit TSCC may control the first to n-th transfer switching signals SS1 to SSn to prevent the first to n-th transfer switches TSW1 to TSWn from being duplicately turned on. For example, as shown in FIG. 6, for a time interval from the first timing t1 to the second timing t2, the voltage of the third node N3 may reach the third reference voltage VR3. Since the first transfer switch TSW1 is turned on for the time interval from the first timing t1 to the second timing t2, the transfer switch control circuit TSCC may not activate the third transfer switching signal TSS3 such that the third transfer switch TSW3 maintains a turned-off state.

At the second timing t2, since the first transfer switching signal SS1 is deactivated, the transfer switch control circuit TSCC may activate the third transfer switching signal TSS3 such that the third transfer switch TSW3 is turned on. The third transfer switching signal TSS3 may remain activated from the second timing t2 to a third timing t3. Similarly to what has previously been described, at the third timing t3, the voltage of the third node N3 decreases to a third minimum voltage VM3, and in response to this, the transfer switch control circuit TSCC may deactivate the third transfer switching signal TSS3. In example embodiments, the third minimum voltage VM3 may be a voltage that is predetermined by the third maximum power point tracking circuit MPPT3.

Subsequent operations are performed in a similar manner as previously described. For example, for a time interval from the second timing t2 to the third timing t3, the voltage of the first node N1 may reach the first reference voltage VR1. Since the third transfer switching signal TSS3 is activated for the time interval from the second timing t2 to the third timing t3, the third transfer switching signal SS3 becomes deactivated and the first transfer switching signal TSS1 becomes activated.

The first transfer switching signal TSS1 maintains an activated state from the third timing t3 to a fourth timing t4. For this time interval, the voltage of the second node N2 may reach the second reference voltage VR2, and the voltage of the third node N3 may reach the third reference voltage VR3. At the fourth timing t4, the transfer switch control circuit TSCC may deactivate the first transfer switching signal TSS1, and activate the transfer switching signal (that is, the second transfer switching signal TSS2) corresponding to the node of which a voltage reaches the reference voltage (that is, the second node N2).

Similarly to what has previously been described, for a time interval from the fourth timing t4 to a fifth timing t5, the second transfer switching signal TSS2 is activated, for a time interval from the fifth timing t5 to a sixth timing t6, the third transfer switching signal TSS3 is activated, for a time interval from the sixth timing t6 to a seventh timing t7, the first transfer switching signal TSS1 is activated, and for a time interval from the seventh timing t7 to an eighth timing t8, the second transfer switching signal TSS2 is activated.

As described above, the multi-input power manager 110 according to the embodiment of the inventive concept may receive the plurality of powers from the plurality of power sources through the plurality of maximum power point tracking circuits, and output the output powers on the basis of order in which the voltages of capacitors for storing the powers reach the corresponding reference voltages. Accordingly, since the plurality of powers may be used without power dissipation, the power system with improved efficiency is provided.

Figure 7:
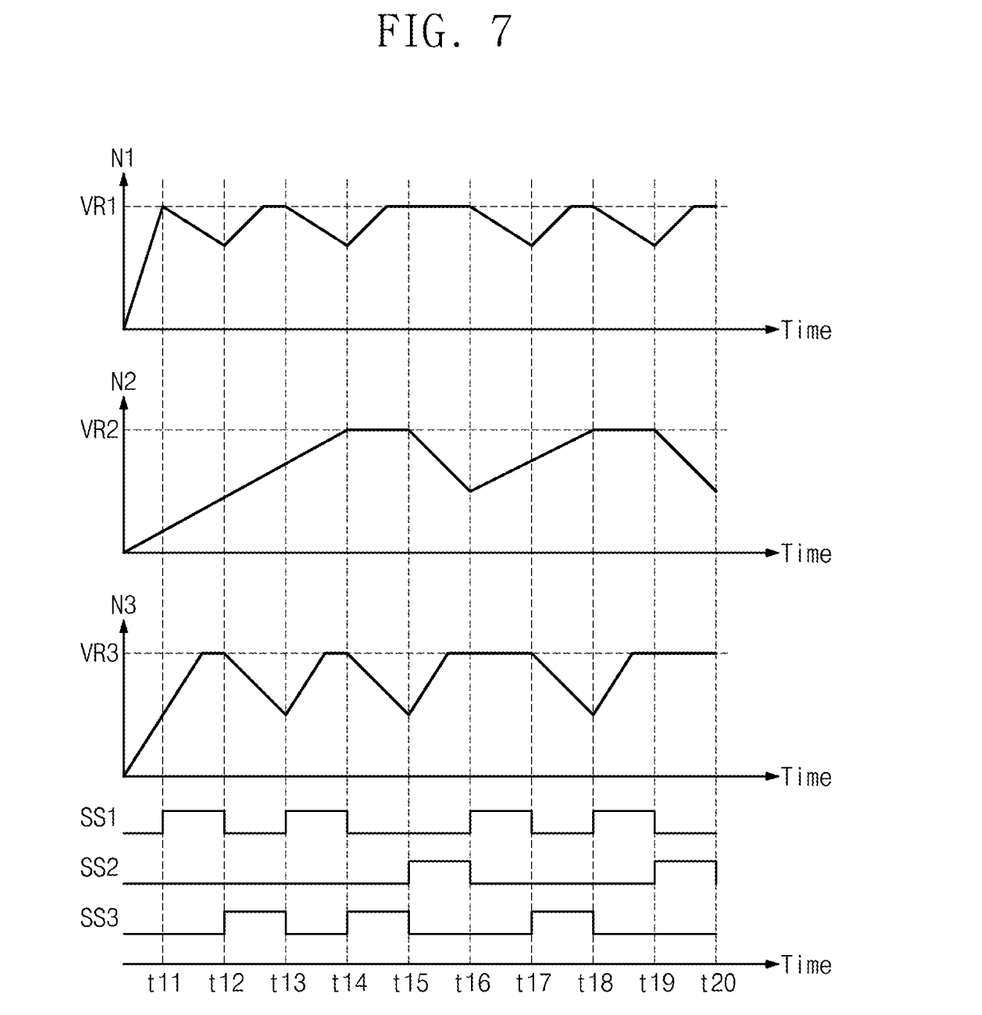
FIG. 7 is a graph showing an operation of the multi-input power manager in FIG. 2, according to another embodiment of the inventive concept.

FIG. 7 is a graph showing an operation of the multi-input power manager of FIG. 2, according to another embodiment of the inventive concept. For brevity of description, detailed descriptions about components previously described will be omitted herein. Unlike the previous embodiment shown in FIG. 6, switches are turned on for predetermined times in an embodiment shown in FIG. 7.

For example, referring to FIGS. 2 to 7, at an $11^{th}$ timing t11, the voltage of the first node N1 may reach the first reference voltage VR1. In this case, the transfer switch control circuit TSCC activates the first transfer switching signal TSS1. Unlike the previous embodiment of FIG. 6, the first transfer switching signal TSS1 is activated for a predetermined time in the embodiment shown in FIG. 7. In other words, the activated transfer switching signal is deactivated when the voltage of the node reaches the minimum voltage in the embodiment of FIG. 6; however, the transfer switching signal is activated for the predetermined time in the embodiment of FIG. 7.

The voltage of the third node N3 may reach the third reference voltage VR3 between the $11^{th}$ timing t11 and a $12^{th}$ timing t12. Similarly to what has previously been described, at the $12^{th}$ timing t12, the first transfer switching signal TSS1 is deactivated, and the third transfer switching signal SS3 is activated. Similarly, for a time interval from the $12^{th}$ timing t12 to a $13^{th}$ timing t13 (that is, a predetermined time), the third transfer switching signal TSS3 is activated.

Subsequent operations are performed in a similar manner as previously described. For example, for a time interval from the $13^{th}$ timing t13 to a $14^{th}$ timing t14 (that is, a predetermined time), the first transfer switching signal TSS1 is activated, for a time interval from the $14^{th}$ timing t14 to a $15^{th}$ timing t15 (that is, a predetermined time), the third transfer switching signal SS3 is activated, for a time interval from the $15^{th}$ timing t15 to a $16^{th}$ timing t16 (that is, a predetermined time), the second transfer switching signal SS2 is activated, for a time interval from the $16^{th}$ timing t16 to a $17^{th}$ timing t17 (that is, a predetermined time), the first transfer switching signal TSS1 is activated, for a time interval from the $17^{th}$ timing t17 to an $18^{th}$ timing t18 (that is, a predetermined time), the third transfer switching signal SS3 is activated, for a time interval from the $18^{th}$ timing t18 to a $19^{th}$ timing t19 (that is, a predetermined time), the first transfer switching signal SS1 is activated, and for a time interval from the $19^{th}$ timing t19 to a $20^{th}$ timing t20 (that is, a predetermined time), the second transfer switching signal TSS2 is activated.

As described in detail, according to the embodiment shown in FIG. 4, the multi-input power manager 110 according to the embodiment of the inventive concept may receive the plurality of powers from the plurality of power sources through the plurality of maximum power point tracking circuits, and output the output powers on the basis of order in which the voltages of capacitors for storing the powers reach the corresponding reference voltages. In this case, the multi-input power manager 110 may output a single power as the output power for the predetermined time. Accordingly, since the plurality of powers may be used without power dissipation, the power system with improved efficiency is provided.

Figure 8:
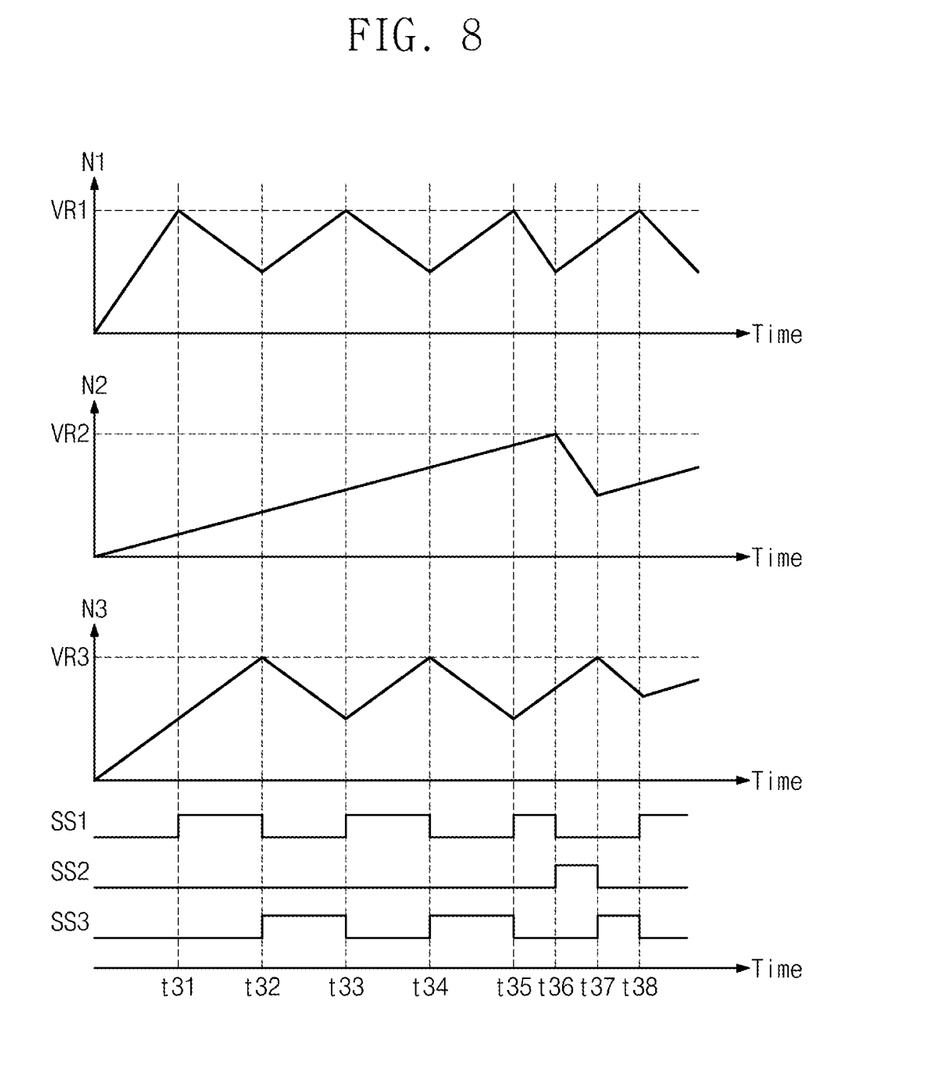
FIG. 8 is a graph showing an operation of the multi-input power manager in FIG. 2, according to another embodiment of the inventive concept.

FIG. 8 is a graph showing an operation of the multi-input power manager illustrated in FIG. 2, according to another embodiment of the inventive concept. For brevity of description, detailed descriptions about components previously described will be omitted herein. Unlike the previous embodiments shown in FIGS. 6 and 7, in an embodiment shown in FIG. 8, a transfer switching signal corresponding to any one node is activated when the any one node of the plurality of nodes reaches the corresponding reference voltage.

For example, referring to FIGS. 2 to 8, at a $31^{st}$ timing t31, the voltage of the first node N1 may reach the first reference voltage VR1. In this case, the transfer switch control circuit TSCC activates the first transfer switching signal TSS1. After that, at a $32^{nd}$ timing t32, the voltage of the third node N3 may reach the third reference voltage VR3. In this case, unlike what has been described with reference to FIGS. 6 and 7, the transfer switch control circuit TSCC deactivates the first transfer switching signal TSS1 and activates the third transfer switching signal TSS3, irrespective of the predetermined time or the minimum voltage. At a $33^{rd}$ timing t33, the voltage of the first node N1 reaches the first reference voltage VR1, and accordingly, the control logic circuit 112 deactivates the third transfer switching signal TSS3, and activates the first transfer switching signal TSS1. Subsequent operations will be performed in a similar manner as previously described.

For example, at a $34^{th}$ timing t34, the voltage of the third node N3 reaches the third reference voltage VR3, and accordingly, the transfer switch control circuit TSCC deactivates the first transfer switching signal TSS1, and activates the third transfer switching signal TSS3. At a $35^{th}$ timing t35, the voltage of the first node N1 reaches the first reference voltage VR1, and accordingly, the transfer switch control circuit TSCC deactivates the third transfer switching signal TSS3, and activates the first transfer switching signal TSS1. At a $36^{th}$ timing t36, the voltage of the second node N2 reaches the second reference voltage VR2, and accordingly, the transfer switch control circuit TSCC deactivates the first transfer switching signal TSS1, and activates the second transfer switching signal TSS2. At a $37^{th}$ timing t37, the voltage of the third node N3 reaches the third reference voltage VR3, and accordingly, the transfer switch control circuit TSCC deactivates the second transfer switching signal TSS2, and activates the third transfer switching signal TSS3. At a $38^{th}$ timing t38, the voltage of the first node N1 reaches the first reference voltage VR1, and accordingly, the transfer switch control circuit TSCC deactivates the third transfer switching signal TSS3, and activates the first transfer switching signal TSS1.

As described above, according to the embodiment shown in FIG. 5, the multi-input power manager 110 according to the embodiments of the inventive concept may receive the plurality of powers from the plurality of power sources through the plurality of maximum power point tracking circuits, and output the output powers on the basis of order in which the voltages of capacitors for storing the powers reach the reference voltages. Accordingly, since the plurality of powers may be used without power dissipation, the multi-input power system with improved efficiency is provided.

In example embodiments, the embodiments described with reference to FIGS. 6 to 8 are exemplarily provided to clearly describe the technical spirit of the present invention, and the technical spirit of the present invention is not limited thereto. The graphs shown in FIGS. 6 to 8 are schematized graphs, and a slope, a shape, a waveform, etc. of the graph may be variously modified according to actual power sources, power environments, and system configurations.

Figure 9:
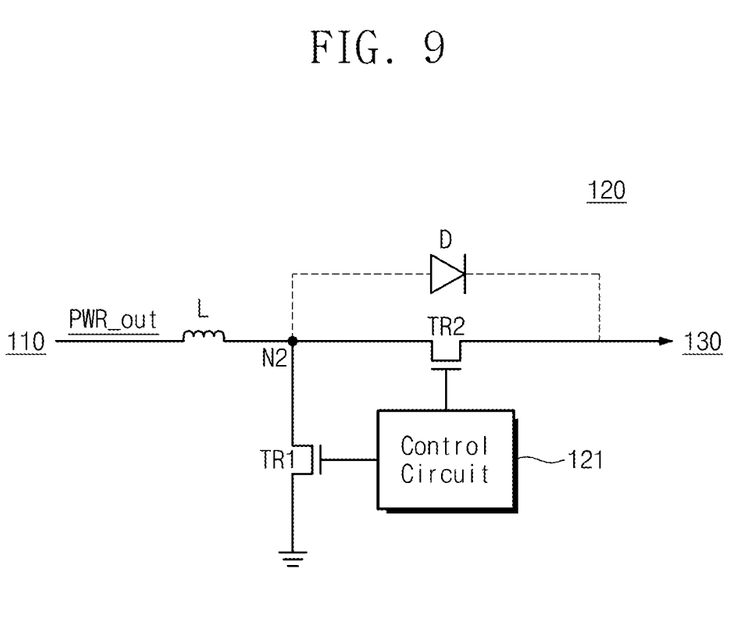
FIG. 9 is a circuit diagram illustrating a power converter illustrated in FIG. 1.

FIG. 9 is a circuit diagram illustrating the power converter in FIG. 1. Referring to FIGS. 1 and 9, the power converter 120 may include an inductor L, a first transistor TR1, a second transistor TR2, and a control circuit 121.

The inductor L has one end for receiving the output power PWR_out from the multi-input power manager 110, and the other end connected to a second node N2. The first transistor TR1 has one end connected to the second node N2, the other end connected to a ground terminal, and a gate electrode for receiving a control signal from the control circuit 121. The second transistor TR2 has one end connected to the second node N2, the other end connected to the power storage device 130, and a gate electrode for receiving a control signal from the control circuit 121.

The power converter 120 may perform the same operations as a buck converter. For example, the control circuit 121 may turn on the first transistor TR1. At this moment, the second transistor TR2 is in a turned-off state. When the first transistor TR1 is turned on, the output power PWR_out from the multi-input power manager 110 may be stored in the inductor L. After a predetermined time, the control circuit 121 may turn off the first transistor TR1, and turn on the second transistor TR2. At this time, the power stored in the inductor L is supplied as the converted power PWR_con to the power storage device 130 through the second transistor TR2.

In example embodiments, a diode D instead of the second transistor TR2 may be connected between the second node N2 and the power storage device 130. Thus, when the first transistor TR1 becomes turned off, the voltage of the second node N2 increases due to the power stored in the inductor L, and accordingly, the diode D becomes turned on. In this case, the power stored in the inductor L may be supplied to the power storage device 130 through the diode D.

In example embodiments, the control circuit 121 may be included in the power transfer circuit 111 illustrated in FIG. 2.

In example embodiments, the power converter 120 illustrated in FIG. 9 is an illustrative example, and the scope of the inventive concept is not limited thereto. For example, the power converter 120 illustrated in FIG. 9 has a structure of the buck converter, however, the scope of the inventive concept is not limited thereto. Thus, the power converter 120 according to the embodiment of the inventive concept may include various converters such as the buck converter, a boost converter, a buck boost converter, and a DC chopper.

In example embodiments, even though the multi-input power manager 110 and the power converter 120 are illustrated as separate blocks, the scope of the inventive concept is not limited thereto, and the multi-input power manager 110 and the power converter 120 may be realized as a single apparatus, a single module, or a single package.

In example embodiments, the first control circuit CC1 in FIG. 3 (or, control circuits included in other maximum power point tracking circuits), the transfer switch control circuit TSCC in FIG. 4, or the time-interleaving controller TIC in FIG. 5 may be realized as a single control logic circuit, or a single control logic module.

As described above, according to the embodiments of the inventive concept, powers are supplied from the plurality of power sources to the power storage device by using the time-interleaving technique, so that the powers from the plurality of power sources may be efficiently used without power dissipation. In addition, according to the embodiment of the inventive concept, since a single converter is used, it is possible to miniaturize the power harvesting system.

Although the exemplary embodiments of the inventive concept have been described herein, it is understood that various changes and modifications can be made by those skilled in the art within the spirit and scope of the inventive concept. Therefore, the scope of the inventive concept is defined by the following claims or the equivalents rather than the foregoing description and the exemplary embodiments described therein.

What is claimed is:

1. A multi-input power manager comprising:
    first to n-th maximum power point tracking (MPPT) circuits configured to respectively receive first to n-th powers (where, n is a natural number greater than one) through first to n-th input nodes from the outside, and to respectively control voltages of first to n-th nodes to be first to n-th reference voltages on the basis of the first to n-th powers;
    first to n-th input capacitors configured to respectively store the first to n-th powers according to control of the first to n-th MPPT circuits, and respectively connected to the first to n-th nodes;
    first to n-th transfer switches respectively connected to the first to n-th nodes, and configured to serially output powers, which are respectively stored in the first to n-th input capacitors, to a single output node in response to first to n-th transfer switching signals; and
    a transfer switch control circuit configured to compare the first to n-th reference voltages and the voltages of the first to n-th nodes, respectively, and to generate the first to n-th transfer switching signals according to comparison results,
    wherein the first to n-th transfer switching signals are selectively activated to turn on one of the first to n-th transfer switches at a time, and
    wherein, when the voltage of the first node reaches the first reference voltage, the transfer switch control circuit activates the first transfer switching signal to turn on the first transfer switch connected to the first node.

2. The multi-input power manager of claim 1, wherein, when the first transfer switching signal is activated, the transfer switch control circuit deactivates the second to n-th transfer switching signals to turn off the second to n-th transfer switches.

3. The multi-input power manager of claim 1, wherein, when the voltage of the first node connected to the first transfer switch which is turned on reaches a first minimum voltage, the transfer switch control circuit deactivates the first transfer switching signal to turn off the first transfer switch.

4. The multi-input power manager of claim 3, wherein, after the first transfer switch is turned off, the transfer switch control circuit generates the first to n-th transfer switching signals to turn on a transfer switch, which is connected to the node having a voltage reaching the corresponding reference voltage among the second to n-th nodes.

5. The multi-input power manager of claim 1, wherein the first MPPT circuit comprises:
    a first voltage ratio controller configured to receive the first power, and determine the first reference voltage based on the received first power;
    a first internal capacitor configured to be charged to the first power according to control of the first voltage ratio controller;
    a first switch connected between the first internal capacitor and the first node;
    a first comparator configured to compare the first reference voltage and a voltage of the first internal capacitor; and
    a first control circuit configured to control the first switch based on a comparison result of the first comparator.

6. The multi-input power manager of claim 1, wherein the first to n-th reference voltages are different from each other.

7. The multi-input power manager of claim 1, wherein at least two of the first to n-th powers are supplied from a same power source, and at least two of the first to n-th reference voltages are equal to each other.

8. The multi-input power manager of claim 1, wherein the transfer switch control circuit deactivates the first transfer switching signal after a predetermined time elapses from when the first transfer switching signal is activated.

9. The multi-input power manager of claim 1, wherein the transfer switch control circuit deactivates the first transfer switching signal when the voltage of at least one node of the second to n-th nodes reaches the corresponding reference voltage.

10. The multi-input power manager of claim 9, wherein, after deactivating the first transfer switching signal, the transfer switch control circuit generates the first to n-th transfer switching signals to turn on the transfer switch connected to the at least one node.

11. The multi-input power manager of claim 1, wherein the first to n-th reference voltages respectively indicate voltages at which the first to n-th powers become maximum powers.

12. A multi-input power manager comprising:
    a first maximum power point tracking (MPPT) circuit configured to receive a first power and track a maximum power point of the first power;
    a first capacitor configured to store the first power under control of the first MPPT circuit;
    a first transfer switch configured to operate in response to a first transfer switching signal and connected between the first capacitor and an output node;
    a second MPPT circuit configured to receive a second power and track a maximum power point of the second power;
    a second capacitor configured to store the second power under control of the second MPPT circuit;
    a second transfer switch configured to operate in response to a second transfer switching signal and connected between the second capacitor and the output node; and
    a transfer switch control circuit configured to generate the first and second transfer switching signals based on a comparison of a first reference voltage from the first MPPT circuit and a voltage of the first capacitor and a comparison of a second reference voltage from the second MPPT circuit and a voltage of the second capacitor,
    wherein the first and second transfer switching signals are selectively activated to turn on one of the first and second transfer switches at a time, and
    wherein, when the voltage of one of the first and second capacitors reaches the corresponding reference voltage, the transfer switch control circuit generates the first and second transfer switching signals to turn on a transfer switch connected to the one of the first and second capacitors.

13. The multi-input power manager of claim 12, wherein the first and second reference voltages are different from each other.

14. The multi-input power manager of claim 12, wherein the first MPPT circuit comprises:
- a first voltage ratio controller configured to receive the first power and determine the first reference voltage at which the received first power becomes a maximum power;
- a first internal capacitor configured to be charged to a power from the first voltage ratio controller;
- a first switch connected between the first internal capacitor and the first capacitor;
- a first comparator configured to compare the first reference voltage and a voltage of the first internal capacitor; and
- a first control circuit configured to control the first switch based on a comparison result of the first comparator.

15. The multi-input power manager of claim 14, wherein the second MPPT tracking circuit comprises:
- a second voltage ratio controller configured to receive the second power and determine the second reference voltage at which the received second power becomes a maximum power;
- a second internal capacitor configured to be charged to a power from the second voltage ratio controller;
- a second switch connected between the second internal capacitor and the second capacitor;
- a second comparator configured to compare the second reference voltage and a voltage of the second internal capacitor; and
- a second control circuit configured to control the second switch based on a comparison result of the second comparator.

* * * * *